TAPE PLAYER REVERSING MECHANISM

Filed April 2, 1968 4 Sheets-Sheet 1

INVENTORS
LEON S. IDOINE,
RICHARD B. SAXON
BY Williamson, Palmatier & Bains
ATTORNEYS Oct. 14, 1969 L. S. IDOINE ET AL 3,472,465

TAPE PLAYER REVERSING MECHANISM

Filed April 2, 1968 4 Sheets-Sheet 2

INVENTORS
LEON S. IDOINE,
RICHARD B. SAXON

BY Williamson, Palmatier & Bains

ATTORNEYS

Oct. 14, 1969 L. S. IDOINE ET AL 3,472,465

TAPE PLAYER REVERSING MECHANISM

Filed April 2, 1968 4 Sheets-Sheet 3

INVENTORS
LEON S. IDOINE,
RICHARD B. SAXON
BY Williamson, Palmatier, & Bains
ATTORNEYS INVENTORS
LEON S. IDOINE,
RICHARD B. SAXON
BY Williamson, Palmatier & Bains
ATTORNEYS 3,472,465
Patented Oct. 14, 1969

3,472,465

TAPE PLAYER REVERSING MECHANISM

Leon S. Idoine and Richard B. Saxon, Frederick, Md., assignors to Burgess Publishing Company, Minneapolis, Minn., an organization of Minnesota Filed Apr. 2, 1968, Ser. No. 718,037
Int. Cl. G11b *15/44*
U.S. Cl. 242—201 8 Claims

ABSTRACT OF THE DISCLOSURE

A tape playing machine having shiftable drive wheels for transmitting power from a rotary drive shaft to either a forward drive, take-up spindle or a reverse drive, supply spindle, incorporates a rotary control shaft to actuate linkage means operative to shift the drive wheels between forward and reverse drive positions; a cam on the control shaft serves to open and close a limit switch connected to a motor which rotates the control shaft to effect the reversal of the tape drive. The engagement of a capstan drive for the tape is coordinated with the shifting of the drive wheels by two cams on the control shaft which sequentially actuate separate sets of shifting linkages for the drive wheels and the capstan drive.

Background of the invention

Tape recording and listening machines have conventionally incorporated some type of reversing mechanism for winding a tape backwards on its supply reel to replay a portion of the tape which has been previously recorded. The reversing mechanisms now available frequently employ solenoid actuators to operate levers which shift drive wheels between forward and reverse drive positions. Not only are such solenoid actuators noisy, but they are further disadvantageous in that they must be kept energized during the entire time that the tape reels are being driven in a reverse or rewinding direction to hold the drive wheels in the reverse drive position. The higher quality machines also employ a capstan drive for controlled feed-in of the tape, and the mechansms employed for operating the capstan drive in the proper time sequence with the shifting of the drive wheels between reverse and forward drive positions have required complicated and expensive electrcal control circuits. The noise and cost associated with such prior art machines have rendered them particularly unsuitable for class room use by students where quietness of operation and economy are important factors. There is thus a need for tape playing machine having a simplified reversing mechanism which may be manufactured at a relatively low cost, and which permits listeners, especially students, to replay recorded segments of special interest.

Brief summary of the invention

Having in mind the foregoing disadvantages associated with prior art reversing mechanisms tfor tape playing machines, we have developed a unique reversing mechanism which is particularly characterized by its simplicity of operation and quietness.

These basic objectives are achieved by using a motor driven control shaft to operate a linkage system for shifting drive wheels between forward and reverse drive positions, the rotation of the control shaft being controlled by a limit switch which is opened and closed by a cam actuator carried on the control shaft.

As a particularly advantageous feature of our improved reversing mechanism, we employ two separate linkages to coordinate the engagement of a capstan drive for the tape with the shifting of drive wheels for the tape reel spindles from reverse to forward drive positions, in response to the movement of a power driven control mechanism. In the preferred embodiment of our invention, the power driven control mechanism takes the form of a motor operated cam shaft having two cams thereon so constructed and arranged as to actuate the separate linkages in a predetermined order to accomplish the aforesaid shifting of the spindle drive wheels and the engagement of the capstan drive in the proper sequence.

A further advantageous feature of our invention resides in the utilization of a cam actuator carried on the aforesaid cam shaft to close a switch which connects the machine's amplifier circuit to ground when a tape is being rewound onto its supply spool in a reverse direction, thereby eliminating the undesirable noise which would otherwise accompany a tape backspacing operation.

These and other objects and advantages of our invention will become readily apparent as the following description is read in conjunction with the accompanying drawings wherein like reference numerals have been used to designate like elements throughout the several views.

Brief description of the drawings

FIGURE 1 of the drawings shows a tape playing machine generally indicated by reference numeral 1 on which our improved tape reversing mechanism may be employed. Tape reels 2 and 4 are shown mounted on supply and take-up spindles 3 and 5 respectively, with tape 6 extending therebetween around guide 8 and through housing 10 within which recording and playback heads are mounted. A capstan drive 12 cooperates with idler roller 14 to control the movement of tape 6 therebetween in the direction indicated by the solid arrows as it is taken up on reel 4. Manual control knob 16 may be used to control the operation of capstan drive 12, and control knob 18 may be employed to reverse the direction of rotation of spindles 3 and 5 to either play tape 6 or rewind it on reel 2. The mechanical linkages through which control knobs 16 and 18 control the operation of capstan drive 12 and spindles 3 and 5 have not been shown since they form no part of this invention. Main switch 20 is used to stop and start spindle drive motor 22 shown in FIGURE 4, and switch 24 is used to actuate reversing mechanism control shaft 26 in a manner fully described below. Switch 24 may be either a hand switch or a foot switch, the latter form being shown in FIGURE 1 as the preferred type.

Figure 1:
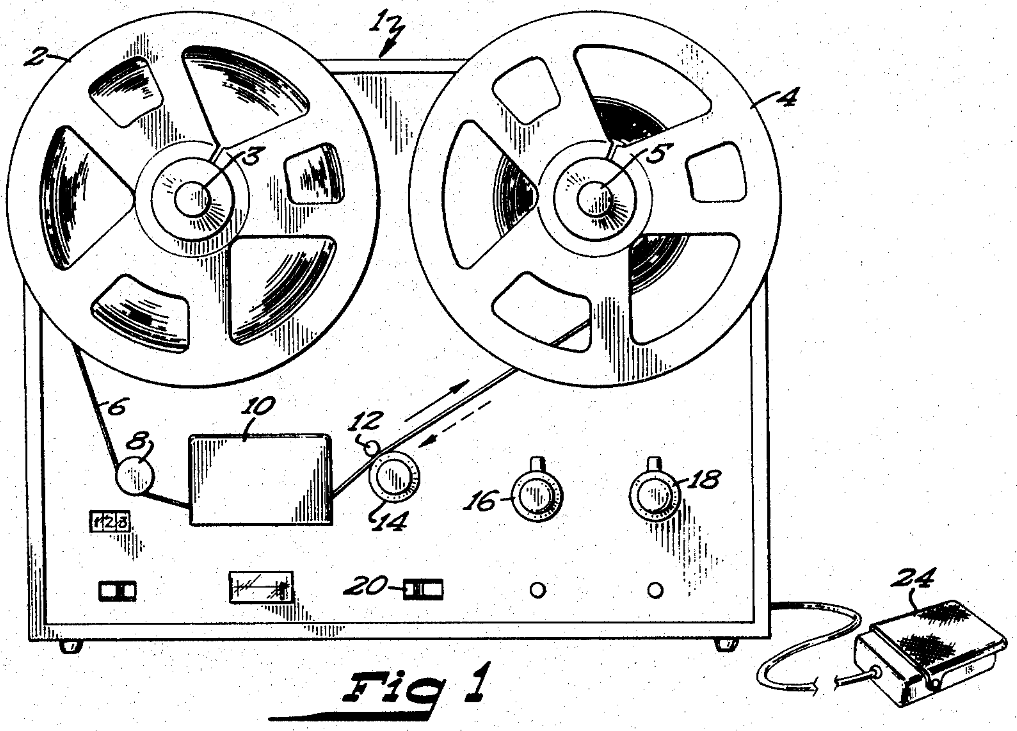
FIGURE 1 is a front, elevation view of a tape playing machine on which the improved reversing mechanism of this invention is installed.
Figure 4:
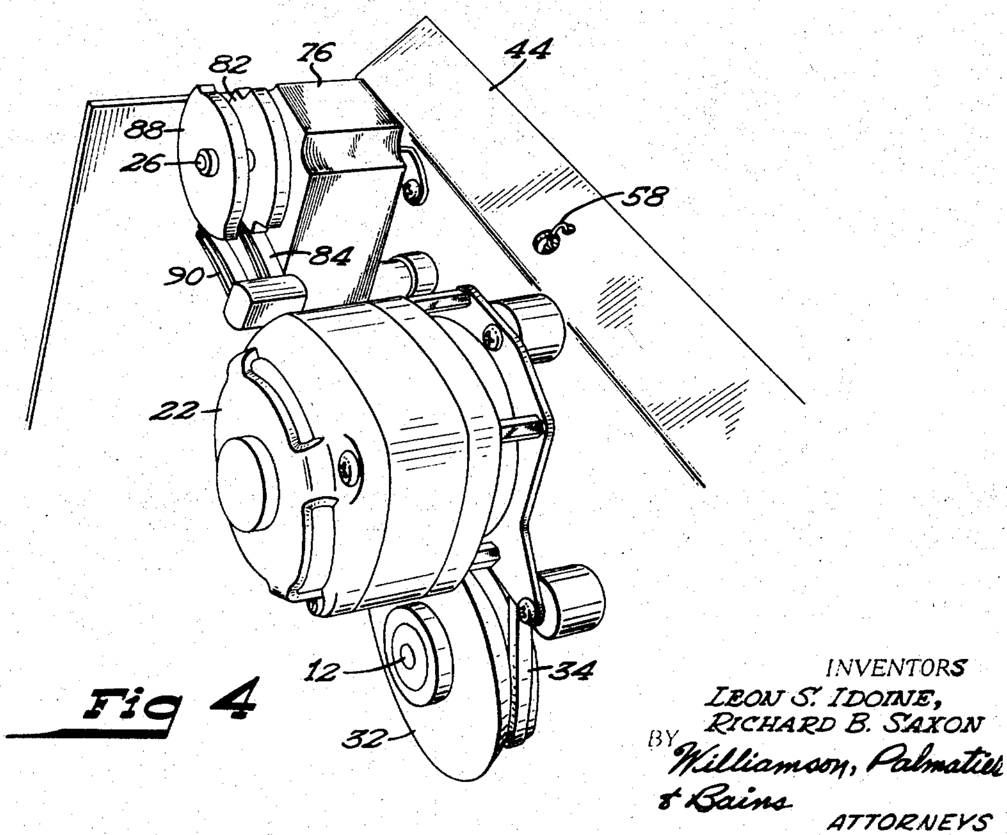
FIGURE 4 is a rear, perspective view of the tape recorder showing the main drive motor and the cam shaft which controls the shifting of the spindle drive wheels between their forward and reverse positions.
Figure 7:
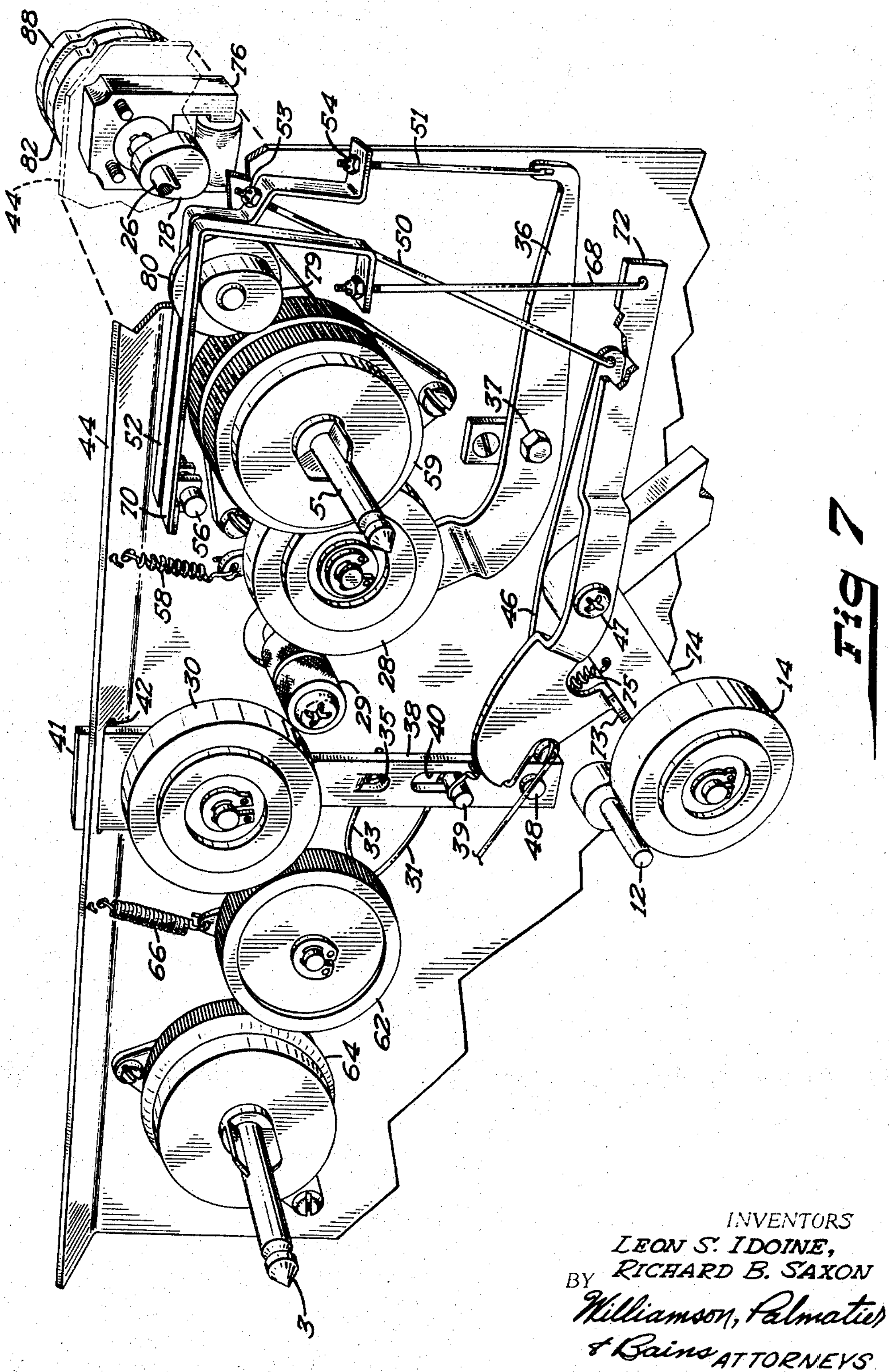
FIGURE 7 is a front, perspective view showing the cams of the control shaft in combination with the linkages which shift the drive wheels between forward and reverse positions.

The machine shown in FIGURE 1 on which our reversing mechanism is designed to be employed would normally be of the type on which tapes may be both recorded and played; however, our unique reversing mechanism would be equally adaptable for use on machines designed for listening only. Various drive mechanisms may be employed for transmitting rotary power from motor 22 to either take-up spindle 5 or supply spindle 3 to propel tape 6 in a forward or reverse direction, the reversed movement of tape 6 when spindle 3 is being driven in a clockwise direction being indicated by the dotted directional arrows in FIGURE 1. An example of the type of spindle drive arrangement with which our improved reversing mechanism may be employed is shown in FIGURE 7. Most tape recorders utilize shiftable drive wheels for transmitting power from a main power input shaft to either the take-up spindle or the supply spindle. In the arrangement shown in FIGURE 7, shiftable idler wheels 28 and 30 serve to transmit power from knurled input shaft 29 to take-up spindle 5 and supply spindle 3 respectively. Knurled drive shaft 29 is directly connected to drive motor 22. As is indicated in FIGURE 4, fly wheel 32 to which capstan drive shaft 12 is connected is also driven from motor 22 by belt 34. Idler wheels 28 and 30 are supported for movement between drive and neutral positions by shiftable mounting means in the form of brackets 36 and 38 respectively. Bracket 36 is pivotally supported at 37, and bracket 38 may be shifted vertically over guide pin 39 extending through slot 40 therein. Bracket 38 is further guided as it moves up and down by top extension 41 which is slidably received within slot 42 in mounting plate 44. Idler wheel 30 is normally biased upwardly towards its neutral position out of contact with drive shaft 29 by a V-shaped spring having one leg 33 acting upwardly on detent 35 projecting rearwardly from bracket 38 and a second leg 31 attached to fixed pin 39. Link 46 pivotally supported at 47 and connected at its forward end to the bottom of bracket arm 38 at 48 serves to move bracket 38 downwardly against the restraining force of spring leg 33 and thereby pull idler wheel 30 into contact with drive shaft 29. Pivotal link 46 is part of a first linkage system including connecting rods 50 and 51 secured at their lower ends to pivotal members 46 and 36 respectively, and adjustably fastened at their upper ends to a first actuating element 52. Connecting rods 50 and 51 are threaded at their upper ends, and are secured to actuating element 52 by means of lock nuts 53 and 54. The threaded connections for rods 50 and 51 permit them to be adjusted with respect to actuating element 52 so as to insure that wheels 28 and 30 will be in the proper positions for forward and reverse drive operations when shifted by the aforesaid linkage system in response to the movement of actuating member 52. The controlled movement of actuating element 52 about pivot point 56 is accomplished by cam shaft 26 in a manner explained below.

Idler wheel 28 is biased upwardly by spring 58 into the normal position in which it drivingly engages ring 59 to transmit power from knurled drive shaft 29 to take-up spindle 5. Ring 59 drives spindle 5 through a standard slip clutch mechanism which operates in conjunction with capstan mechanism 12, 14 to impose the proper tension on tape 6 as it is being pulled forwardly onto take-up reel 4. Idler wheel 30 acts upon additional idler wheel 62 to transmit power from drive shaft 29 to supply spindle 3. Idler wheel 62 engages drive ring 64 mounted on spindle 3, and is biased upwardly into constant engagement with ring 64 and idler wheel 30 by spring 66.

When changing the direction of rotation of tape spindles 3 and 5 from forward to reverse drive and vice versa, it is very important that the engagement and disengagement of capstan drive 12, 14 be properly coordinated with the shifting of idler wheels 28 and 30 between their forward and reverse drive positions. For example, if idler roller 14 were shifted out of its position of coaction with capstan drive shaft 12 while spindle 5 is still being driven by idler wheel 28 in the forward direction indicated by the solid arrows in FIGURE 1 in the course of shifting from forward to reverse drive, the tension imposed on tape 6 by capstan mechanism 12, 14 would be released too soon causing tape to be pulled off of supply reel 2 by take-up spindle 5 at an excessive rate. Also, in shifting from reverse to forward drive, wheel 28 should start rotating spindle 5 before capstan mechanism 12, 14 is engaged in order to avoid the formation of slack in tape 6 and the subsequent popping noise as the loose loops of tape are quickly taken up by reel 4 rotating on spindle 5. Thus, the shifting of drive wheels 28 and 30 should be completed before the engagement or disengagement of capstan drive mechanism 12, 14 when changing the direction in which tape 6 is being pulled. To accomplish this necessary sequential operation of drive wheels 28 and 30 and capstan mechanism 12, 14, we have provided a separate linkage system for moving idler roller 14 in and out of operative association with capstan drive 12 in response to the rotation of control shaft 26. This second linkage system is comprised of a connecting rod 68 which is adjustably secured at its upper end to a second actuating element 70 and connected at its lower end to one end of pivotal link 72. Link 72 pivots about point 47, and is provided with a foot 73 at its forward end which bears upon bell crank 74 on which idler roller 14 is shiftably mounted. Spring 75 extending between fixed pin 39 and crank 74 biases link 72 and crank 74 to a normal position in which idler roller 14 is brought into its position of coaction with capstan drive 12.

Figure 2:
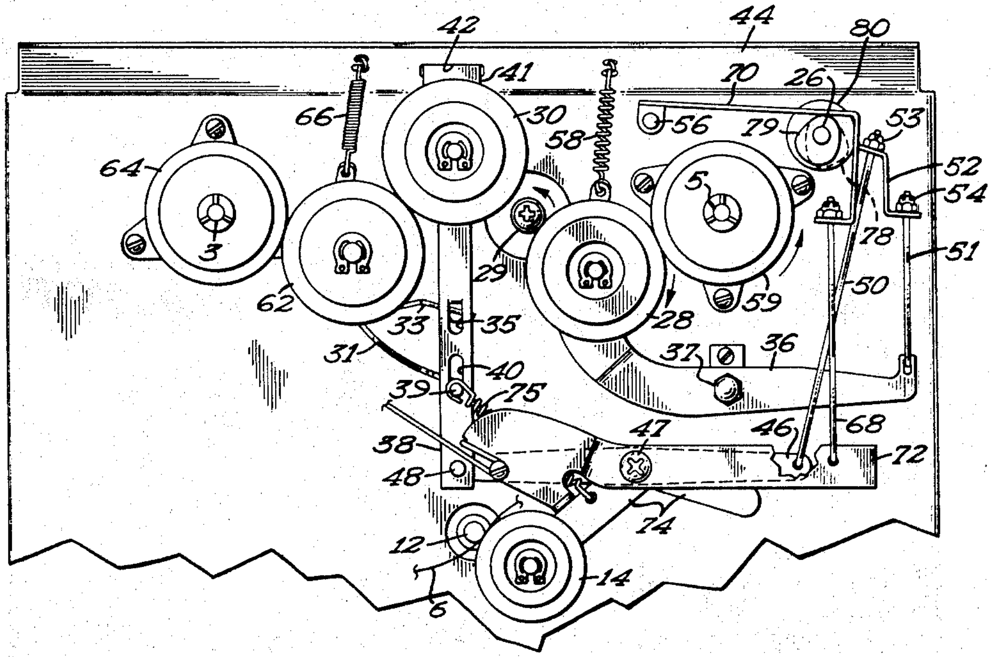
FIGURE 2 is a front, elevation view of the machine of FIGURE 1 with the front housing removed, and showing the spindle drive wheels in their forward drive positions.
Figure 3:
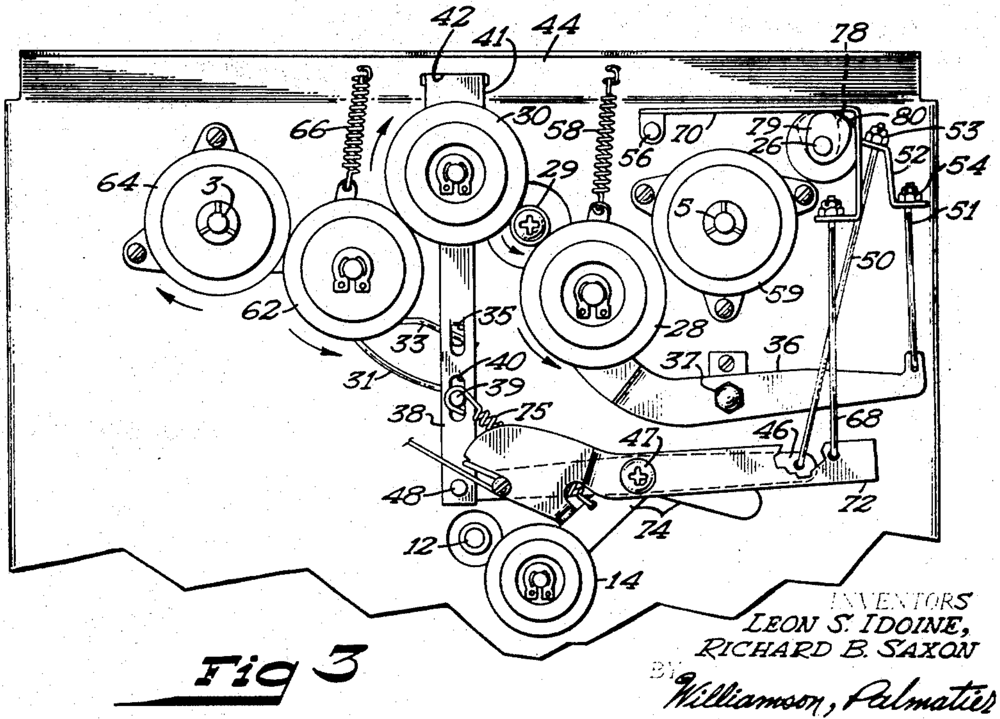
FIGURE 3 is a view similar to FIGURE 2 showing the spindle drive wheels in their reverse drive positions.
Figure 5:
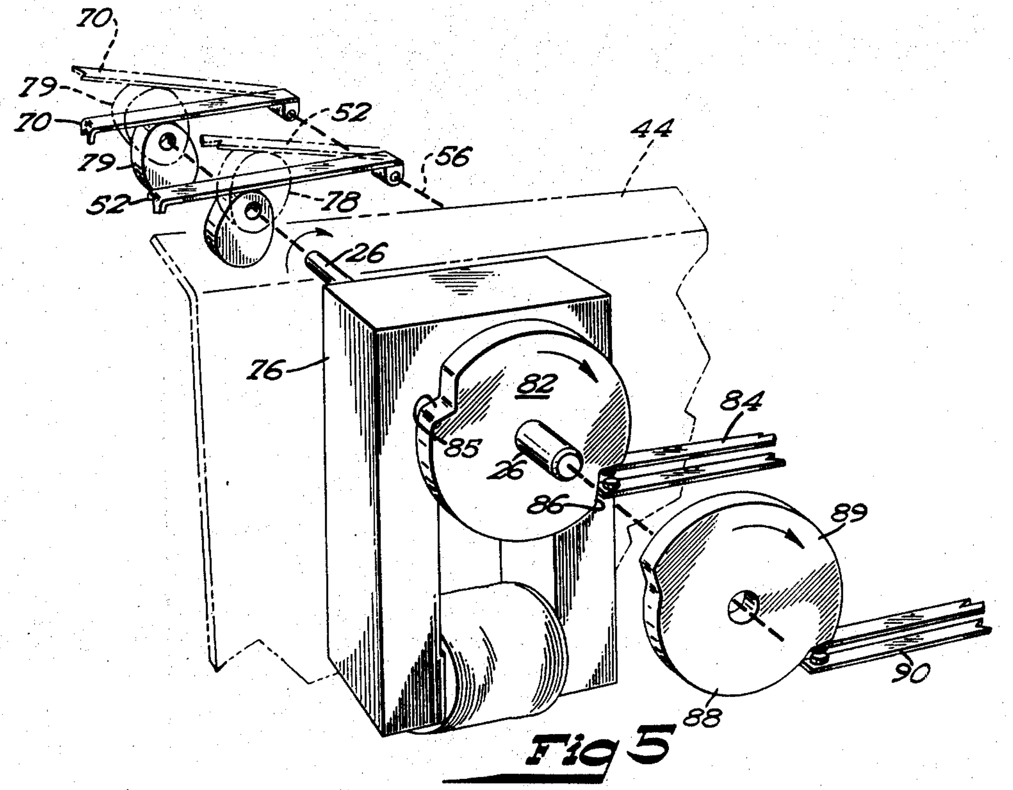
FIGURE 5 is a rear, perspective view of the cam shaft which controls the operation of the reversing mechanism.
Figure 6:
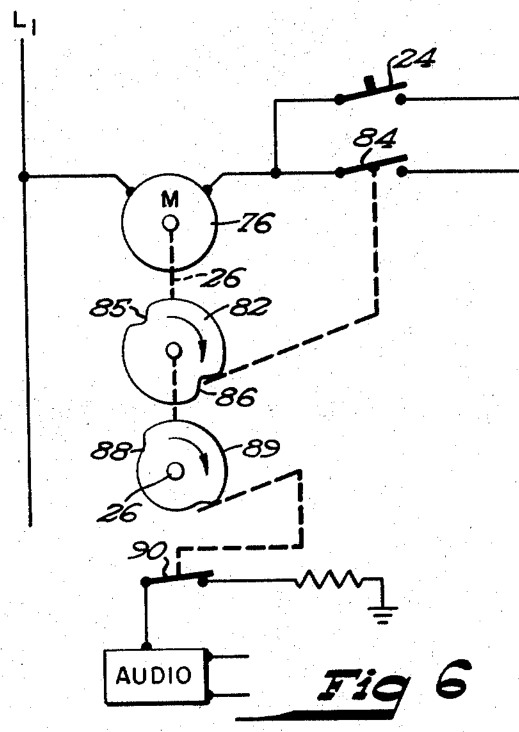
FIGURE 6 is a control circuit diagram.

Although various types of actuating mechanisms could be operatively associated with control shaft 26 so as to move connecting rods 50, 51, and 68 up and down in the desired time sequence, we prefer to use cam actuators for this purpose which will now be described with reference to FIGURES 5 and 7. A separate drive motor 76 is preferably employed to impart rotary motion to control shaft 26. It is to be noted, however, that shaft 26 could also be driven from motor 22 by a switch actuated clutch. Mounted on the front end of control shaft 26 on the front side of mounting plate 44 are two cams 78 and 79 separated by a spacer 80. Cams 78 and 79 are so constructed and arranged that as control shaft 26 rotates in the direction indicated by the arrows in FIGURES 5 and 7 (which is a counterclockwise direction when viewing the control mechanism from the front of mounting plate 44 in FIGURE 7) rear cam 78 will always displace pivotal actuating element 52 before front cam 79 moves actuating element 70. This arrangement insures that drive wheels 28 and 30, which are shifted by the first linkage system in response to the movement of actuating element 52, will be shifted between their drive and neutral positions before idler roller 14 is shifted by the second linkage system in response to the movement of actuator element 70. In the preferred embodiment of our invention, we achieve the aforesaid sequential displacement of actuator elements 52 and 70 by providing cams 78 and 79 with identical contours and arranging them on cam shaft 26 in the positions shown with one cam being the mirror image of the other. Identical cam contours are preferred for manufacturing economy; however, various cam contours and positions could obviously be employed to achieve the desired operating sequence of the two linkage systems. In order to control the rotation of cam shaft 26 so that cams 78 and 79 will be rotated through the portion of a revolution necessary to completely displace actuating elements 70 and 52, we provide an additional cam 82 on control shaft 26 to open and close motor control switch 84. Notches 85 and 86 are spaced 180° apart around the periphery of cam 82 so as to close and open switch 84 each time that control shaft 26 rotates 180°, or one half of a revolution. The control mechanism is completed by a cam 88 having a lobe or raised portion 89 on its periphery which serves to close a switch 90 when tape 6 is being rewound on reel 2 during a backspacing operation. As may be seen with reference to FIGURE 6, switch 90 serves to ground the machine's audio system when closed by cam 88. Switch 90 is preferably connected to a point in the amplifier circuit of the audio system. When the listener wants to backspace tape 6 by rewinding it on supply reel 2, the tape reversing operation can be carried out very quickly and quietly by simply depressing foot switch 24 for an instant and then releasing it. As is indicated in the control diagram in FIGURE 6, foot switch 24 is connected in series with control motor 76 and in parallel with cam switch 84. Thus, the momentary closing of switch 24 will start motor 76, and cam shaft 26 will begin rotating. Cam 82 will thus be rotated around from the position shown in FIGURE 5 and will close switch 84 and keep it closed until control shaft 26 has rotated through one half a revolution to bring notch 85 around adjacent switch 84 with the result that switch 84 will be opened and motor 76 will be stopped. Starting with cams 78 and 79 in their forward drive positions as indicated in solid lines in FIGURES 2 and 5, the rotation of cam shaft 26 in the direction indicated by the arrows in FIGURES 2, 5, and 7 will cause cam 78 to first engage actuator element 52 and pivot it upwardly to the phantom line position shown in FIGURE 5. The displacement of actuating element 52 upwardly will cause connecting rods 50 and 51 to be raised, thereby pivoting bracket 36 and link 46 downwardly at their forward ends to the positions shown in FIGURE 3. This movement of bracket arm 36 and link 46 will have the effect of shifting idler wheels 28 and 30 downwardly to the reverse drive position shown in FIGURE 3 wherein idler wheel 28 will be disengaged from drive ring 59 on spindle 5 and assume a neutral position. As idler wheel 30 is pulled downwardly it will come into contact with power input shaft 29 and carry spring-loaded idler wheel 62 downwardly with it. Wheel 30 will thus now be in a drive position in which it acts to transmit power from knurled drive shaft 29 through idler wheel 62 to supply spindle 3. Wheels 30 and 62 and spindle 3 will rotate in the direction shown by the arrows in FIGURE 3, and supply reel 2 mounted on spindle 3 will pull tape 6 backwards in the direction shown by the dotted arrow in FIGURE 1. Forward cam 79, being positioned relative to cam 78 in the manner best shown in FIGURES 5 and 7, will not act to push actuator element 70 upwardly to the phantom line position shown in FIGURE 5 until after rear actuator arm 52 has already been raised. The upward movement of actuating element 70 about pivot point 56 will lift connecting rod 68 with the result that pivotal link 72 will pivot downwardly at its forward end to push idler roller 14 out of operative association with capstan drive shaft 12 to the position shown in FIGURE 3. Thus, capstan mechanism 12, 14 will have acted to maintain the desired tension on tape 6 until after drive wheel 28 has been shifted to its neutral position. Cams 78 and 79 will now be in the phantom line position shown in FIGURE 5. Also, cam 89 will have been rotated to the position shown schematically in FIGURE 6 wherein it acts to hold switch 90 closed and ground the amplifier circuit, thereby avoiding the generation of an undesirable noise during the backspacing operation. To change from reverse back to forward drive, switch 24 is again depressed momentarily and cam 82 will act to hold motor switch 84 closed for another 180° revolution of control shaft 26. As cams 78 and 79 are rotated from the positions shown in FIGURE 3 (and in phantom line in FIGURE 5), actuating elements 52 and 70 will again be moved sequentially, with actuating arm 52 first being lowered to the forward drive position shown in FIGURE 2 and in solid lines in FIGURE 5. As connecting rods 50 and 51 are pushed downwardly by actuating element 52 they will release bracket arm 36 and linkage 46 so as to permit springs 58 and 33 to pull idler wheels 28 and 30 back into the forward drive positions shown in FIGURE 2. Idler wheel 30 will thus be raised out of contact with drive shaft 29 to a neutral position, and wheel 28 will be shifted into driving engagement with ring 59 connected to take-up spindle 5. The delayed lowering of actuator arm 70 by rotating cam 79 from the position shown in FIGURE 3 will then cause connecting rod 68 to move downwardly. This action of connecting rod 68 will pivot the forward end of link 72 upwardly so as to disengage foot 73 from bell crank 74, thereby permitting spring 75 to pull idler roller 14 back into its position of coaction with capstan drive 12, as shown in FIGURE 2.

The use of a rotating control shaft 26 directly driven by motor 76 is considered to have several advantages over the use of a solenoid actuator to operate the reversing linkages. In addition to being quicker and quieter, the motor drive arrangement need only be energized for the short time interval required to accomplish the shifting of idler wheels 28, 30, and 14 from one position to another, whereas a solenoid would have to remain energized throughout a backspacing operation to hold the linkages in their reverse drive positions. Also, the use of the two cams 78 and 79 in the manner described above provides a very simple means of sequentially operating the spindle drive wheels and capstan drive mechanism without having to reverse the drive motor 76, or use complicated and expensive electrical control circuits.

We anticipate that those skilled in the art may recognize changes and modifications can be made in the tape recording machine which we have shown and described. For example, other power train arrangements for transmitting rotary power from drive shaft 29 to spindles 3 and 5 could be used. Supply reel 2 could be mounted directly on bracket arm 38, thus eliminating the need for intermediate idler 62. In any case, the improved reversing mechanism of this invention would be equally effective to shift the drive wheels for the supply and take-up spindles in the proper sequence with the engagement and disengagement of the capstan drive. We contemplate that these and other modifications may be made without departing from the spirit and scope of our invention as defined by the following claims.

What we claim is:

1. In a tape playing machine having a first rotary spindle supporting a reel of tape to be played, a second rotary spindle supporting a tape, take-up reel, a rotatably supported drive shaft connected to a power source, and first and second rotary wheels for transmitting power from said drive shaft to said first or second spindles respectively, an improved mechanism for reversing the direction of rotation of said tape spindles comprising:

shiftable mounting means supporting said first and second power transmitting wheels for movement between drive and neutral positions;

linkage means connected to said mounting means and operative to move said mounting means between a first position in which said first wheel is in neutral and said second wheel is in its drive position transmitting power from said drive shaft to said second spindle to pull said tape in a forward direction for listening, and a second position in which said second wheel is in neutral and said first wheel is in its drive position transmitted power from said drive shaft to said first spindle to pull said tape in a reverse direction;

an actuating member for initiating movement of said linkage means, said member being operatively associated with a rotary control shaft driven by a rotary motor; and a switch connected in an electrical circuit in series with said control shaft motor for starting said motor;

a limit switch connected in said circuit in series with said motor; and a cam carried on said control shaft, said cam being constructed and arranged to hold said limit switch closed for a predetermined portion of a revolution of said control shaft and then to open said limit switch, said linkage means being actuated by said member as said control shaft rotates.

2. In a tape playing machine having a first rotary spindle supporting a reel of tape to be played, a second rotary spindle supporting a tape, take-up reel, a rotatably supported drive shaft connected to a power source, and first and second rotary wheels for transmitting power from said drive shaft to said first or second spindles respectively, an improved mechanism for reversing the direction of rotation of said tape spindles comprising:

shiftable mounting means supporting said first and second power transmitting wheels for movement between drive and neutral positions;

linkage means connected to said mounting means and operative to move said mounting means between a first position in which said first wheel is in neutral and said second wheel is in its drive position transmitting power from said drive shaft to said second spindle to pull said tape in a forward direction for listening, and a second position in which said second wheel is in neutral and said first wheel is in its drive position transmitting power from said drive shaft to said first spindle to pull said tape in a reverse direction;

an actuating member for initiating movement of said linkage means, said member being operatively associated with a rotary cam shaft power-driven by an electric motor;

a capstan drive shaft and cooperating idler roller for advancing said tape therebetween at a predetermined rate in said forward direction, said capstan drive shaft being driven by said power source and said idler roller being shiftably supported for movement in and out of its position of coaction with said capstan drive in response to the rotation of said cam shaft; and second linkage means connected to said capstan idler roller, said second linkage means being separate from said first linkage means and movable by a second actuator member which is operably associated with said cam shaft in such a way as to shift said idler roller to said position of coaction with said capstan drive after said second wheel has been shifted to said forward drive position; and switch means connected in an electrical circuit with said cam shaft motor for starting said motor.

3. A tape playing machine as defined in claim 2, and further including:

a switch connecting the audio circuit of said machine to ground; and a cam on said cam shaft constructed and arranged to close said switch when said cam shaft is rotated to a position in which said mounting means has been shifted to said second position and said first spindle is pulling said tape in said said reverse direction.

4. A reversing mechanism for a tape playing machine having first and second rotary spindles on which tape reels are mounted, a power input shaft for driving either said first or second spindle, and a capstan drive shaft cooperable with an idler roller to advance tape at a controlled rate therebetween in a forward direction to be taken up on a reel on said second spindle, comprising:

first and second rotary drive wheels shiftable between a first position in which said first wheel is in neutral and said second wheel operates to transmit power from said power input shaft to said second spindle to pull a tape in a forward direction for listening, and a second position in which said second wheel is in neutral and said first wheel operates to transmit power from said input shaft to said first spindle to pull said tape in a reverse direction;

first linkage means connected to said first and second drive wheels, said first linkage means being operative to move said wheels between said first and second positions;

second linkage means connected to a shiftable support member for said capstan idler roller, said second linkage means being movable separately and independently with respect to said first linkage means;

and first and second actuating elements connected to said first and second linkage means respectively, said actuating elements being operatively associated with a power driven, control mechanism in such a way that said first element actuates said first linkage means to shift said drive wheels between said first and second positions before said second element actuates said second linkage means to shift said idler roller in and out of a position of coaction with said capstan drive, in response to a predetermined movement of said control mechanism.

5. A reversing mechanism as defined in claim 4, wherein said control mechanism comprises:

a rotary control shaft driven by a motor;

a limit switch connected in series with said motor in a control circuit; and a cam actuator for said switch mounted on said control shaft for rotation therewith, said cam actuator being so contoured as to hold said switch closed to permit said control shaft to rotate through a necessary, predetermined portion of a revolution to operate said actuating elements.

6. A reversing mechanism as defined in claim 4, wherein:

said control mechanism comprises a cam shaft carrying first and second cams for rotation therewith; and said actuating elements comprise first and second cam followers in the form of pivotal lever arms, said cams being so constructed and arranged as to sequentially operate said actuator elements when said cam shaft is rotated with said first cam displacing said first actuating element before said second cam displaces said second actuating element.

7. A reversing mechanism as defined in claim 6, wherein:

said cams are of identical configuration and are positioned on said cam shaft at predetermined positions with respect to each other to achieve said sequential operation of said actuating elements.

8. A reversing mechanism as defined in claim 4, wherein said first linkage means comprises:

separate, adjustable connecting rods linking said first actuating element with shiftable brackets on which said first and second drive wheels are mounted.

References Cited

UNITED STATES PATENTS

| | | | |
|---|---|---|---|
| 2,645,495 | 7/1953 | Nelson | 274—4 |
| 2,983,794 | 5/1961 | Shields | 179—100.2 |
| 3,218,397 | 11/1965 | Pastor | 179—100.2 |

LEONARD D. CHRISTIAN, Primary Examiner

U.S. Cl. X.R.

274—11